United States Patent
Smith et al.

(10) Patent No.: US 11,157,773 B2
(45) Date of Patent: Oct. 26, 2021

(54) IMAGE EDITING BY A GENERATIVE ADVERSARIAL NETWORK USING KEYPOINTS OR SEGMENTATION MASKS CONSTRAINTS

(71) Applicant: ADOBE INC., San Jose, CA (US)

(72) Inventors: Cameron Smith, San Jose, CA (US); Yannick Hold-Geoffroy, San Jose, CA (US); Mariia Drozdova, Palaiseau (FR)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/802,243

(22) Filed: Feb. 26, 2020

(65) Prior Publication Data

US 2021/0264207 A1 Aug. 26, 2021

(51) Int. Cl.
*G06K 9/62* (2006.01)
*G06K 9/46* (2006.01)
*G06K 9/00* (2006.01)

(52) U.S. Cl.
CPC ........ *G06K 9/6257* (2013.01); *G06K 9/00268* (2013.01); *G06K 9/00302* (2013.01); *G06K 9/4604* (2013.01); *G06K 9/4652* (2013.01); *G06K 9/6262* (2013.01)

(58) Field of Classification Search
CPC ............. G06K 9/6257; G06K 9/00302; G06K 9/4604; G06K 9/6262; G06K 9/00268; G06K 9/4652
See application file for complete search history.

(56) References Cited

U.S. PATENT DOCUMENTS

| 10,671,838 | B1* | 6/2020 | Bogan, III | ............. G06T 13/80 |
| 2019/0295302 | A1* | 9/2019 | Fu | ......................... G06T 7/0002 |
| 2020/0242800 | A1* | 7/2020 | Chen | .................. G06K 9/00248 |

OTHER PUBLICATIONS

Altwaijry, H., Veit, A., Belongie, S. J., & Tech, C. (Sep. 2016). Learning to Detect and Match Keypoints with Deep Architectures. In BMVC. 12 pages.

Karras, T., Aila, T., Laine, S., & Lehtinen, J. (2017). Progressive growing of gans for improved quality, stability, and variation. arXiv preprint arXiv:1710.10196. 26 pages.

Karras, T., Laine, S., & Aila, T. (2019). A style-based generator architecture for generative adversarial networks. In Proceedings of the IEEE Conference on Computer Vision and Pattern Recognition (pp. 4401-4410). 10 pages.

(Continued)

*Primary Examiner* — Phuoc Tran

(74) *Attorney, Agent, or Firm* — Shook, Hardy & Bacon L.L.P.

(57) ABSTRACT

Images can be edited to include features similar to a different target image. An unconditional generative adversarial network (GAN) is employed to edit features of an initial image based on a constraint determined from a target image. The constraint used by the GAN is determined from keypoints or segmentation masks of the target image, and edits are made to features of the initial image based on keypoints or segmentation masks of the initial image corresponding to those of the constraint from the target image. The GAN modifies the initial image based on a loss function having a variable for the constraint. The result of this optimization process is a modified initial image having features similar to the target image subject to the constraint determined from the identified keypoints or segmentation masks.

20 Claims, 9 Drawing Sheets

(56) References Cited

OTHER PUBLICATIONS

Zhu, J. Y., Krähenbühl, P., Shechtman, E., & Efros, A. A. (Oct. 2016). Generative visual manipulation on the natural image manifold. In European Conference on Computer Vision (pp. 597-613). Springer, Cham. 16 pages.

Hui, Jonathan. (2018). GAN—Some cool applications of GANs. Retrieved from the Internet on Mar. 2, 2020 at URL: https://medium.com/@jonathan_hui/gan-some-cool-applications-of-gans-4c9ecca35900 31 Pages.

Shen, Y., Gu, J., Tang, X., & Zhou, B. (2019). Interpreting the latent space of gans for semantic face editing. arXiv preprint arXiv:1907.10786. https://arxiv.org/abs/1907.10786. 20 pages.

\* cited by examiner

IMAGE EDITING BY A GENERATIVE ADVERSARIAL NETWORK USING KEYPOINTS OR SEGMENTATION MASKS CONSTRAINTS

BACKGROUND

Artificial intelligence techniques have been used to map facial expressions to a person in a video sequence. To generate realistic images, conventional technology often combines and superimposes existing images onto images by using autoencoders and conditional generative adversarial networks (GANs). This technology, however, is still a complex process that requires a sophisticated processing pipeline and large amounts of training data for each network to edit images to have a realistic quality and appearance.

SUMMARY

At a high level, aspects described herein relate to editing an initial image, including video, using a Generative Adversarial Network (GAN) constrained by keypoints or segmentation masks of a target image. In doing this, features of the initial image can be changed to more closely simulate those of the target image. In a particular case, an initial image that includes a face can be edited to change the facial features and expressions of the initial image to simulate the facial features and expressions of a target image. The technology provides a way to edit the initial image to generate a modified initial image by using a different target image as a constraint for the edits.

To edit the initial image based on the constraints of the target image, the latent code of the initial image is generated by passing it through a neural network trained to project an image into the image latent space. From the latent code, the initial image can be reconstructed. This provides the system with both the initial image and its latent code, such that modifications to the latent code result in changes to the initial image when reconstructed.

Keypoints or segmentation masks are generated for the initial image and the target image. Keypoints indicate image landmarks, while segmentation masks indicate areas within the image. Using an image of a face as an example, keypoints might be placed at the corner of a mouth, points along the outline of the nose, and so forth. Segmentation masks identify and delineate areas of the face, such as the nose, ears, or hair. In this way, each pixel of the initial image can be assigned to an identified structure within the image. Keypoints or segmentation masks can also be generated for the target image. Areas of the initial image can be identified as corresponding to portions of the target image. For instance, an initial image of a face for one person has areas that correspond to a target image of a face for a different person, such as a nose or mouth.

Having identified the keypoints or the segmentation masks, a GAN can be employed to edit the initial image using the keypoints or the segmentation masks of the target image as constraints. The GAN can use an area of the target image identified from the keypoints or an area identified from the segmentation masks, or both, as the constraint. That is, the GAN receives as an input the latent code of the initial image and modifies the latent code using a loss function that is constrained by an area of the target image. This optimization process modifies the latent code of the initial image so that the modified latent code generates a modified image having features that simulate those of the target image. The entire target image can be used as a constraint or only certain areas of the target image, such as areas of the target image that correspond to areas of the initial image. By minimizing the loss function during the optimization process, the resulting modified initial image includes areas that simulate those areas of the target image that are used as constraints.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description that follows, and in part, will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Definitions

Figure 1A:
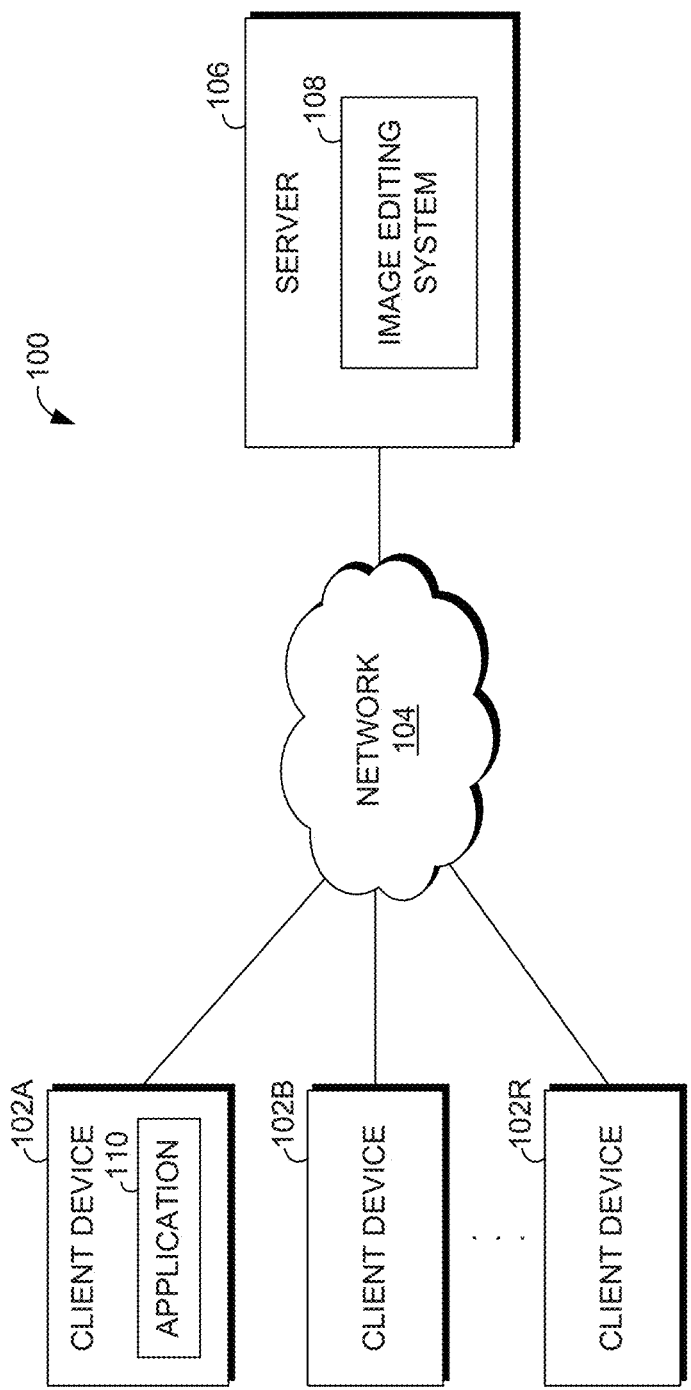
FIG. 1A is a block diagram of an example operating environment suitable for employing an image editing system, in accordance with an aspect described herein.

Various terms are used throughout this description. Definitions of some terms are included below to provide a clearer understanding of the technology.

A "generative adversarial network" (GAN) broadly refers to a class of machine learning systems. Typically, GANs include a competing set of neural networks, where a neural network acts as a "discriminator," while another acts as a "generator." The generator and the discriminator compete based on a loss function to train the competing set. In some systems, the discriminator can be ignored after training.

As used herein, "image latent code" is broadly intended to describe data that is a generated representation of an image. The image latent code is information, typically represented as vectors, that can be used to generate an image. When generating the image latent code, an image is said to be projected into an "image latent space." For instance, when the image latent code is a vector representation of the image, the image latent space is a vector space.

"Keypoints" generally indicate landmark points within an image. Keypoints can be associated with coordinates that identify the location of a keypoint within a spatial dimension.

"Segmentation masks" generally identify and delineate areas of an image by assigning pixels of the image with a particular area, thus segmenting the image into areas having assigned groups of pixels.

Overview

As indicated in the Background section, some systems are available to modify images, including video, in a manner that makes the modified image look realistic. However, these conventional image modification methods fall short in a number of ways. In particular, these conventional image modification methods require sophisticated processes to generate realistic results. For example, even those systems using Generative Adversarial Networks (GANs) do so using conditional GANs that require a large amount of training images and video to generate a realistic output. Thus, while these systems might work for generating realistic content, they can only do so when there is a vast amount of available images and video of that content type on which to train the system. These conventional systems, however, fail to generate high quality, realistic images when there is little training data. As such, these systems fall short when only a few images of a subject are available for editing.

An additional problem that frequently occurs in conventional methods employing GANs includes the disappearance of structure where two areas of images include similar colors, such a person's hair and face. The structure tends to disappear during optimization because the constraints are not well interpreted by the loss function. Thus, where the image of the person having a similar color hair and face is modified, the optimization process fails to identify the boundary or edge of the hairline over multiple iterations, which can ultimately result in a modified image that includes a person having a bald head—not at all the realistic outcome intended.

As also noted in the Background, conventional methods include GANs that modify images. One such method also uses keypoints in conjunction with GANs for image modification. The method, however, requires a conditional GAN trained on a large dataset of images similar to the image that it modifies. In these cases, the keypoints are used as inputs to identify parts of the image that will be adjusted during the modification. The keypoints are applied in a series so as to modify the image towards the keypoints and into the final result. Said differently, the keypoints are placed at locations that the GAN attempts to mimic when modifying the input image. The keypoints, however, are not used in identifying an area as a constraint for a loss function. As a result, this particular model still requires a conditional GAN and a sufficiently large data training set, which remains one of the main problems with the current technology in this field.

To solve these problems, the technology described herein provides for systems that can generate realistic images with limited training data. Utilizing keypoints and segmentation masks of a target image to determine constraints for optimization using GAN eliminates the need for a large training dataset. Thus, unconditional GANs can be employed for image editing, yet also produce images of the same or similar realistic quality as conventional methods. This also reduces the amount of time required to determine a modified output image, allowing the system to provide instantaneous or near-instantaneous output. As such, the technology disclosed herein is better suited or live video editing of images. This real-time feature is not obtainable by the conventional methods due to the necessary training and the time required for generating a realistic output. Still yet another advantage recognized by the disclosed technology is the better identification of boundaries within an image during optimization. Where conventional methods fail to identify this boundary over multiple iterations, the use of keypoints or segmentation masks better identifies the boundaries, making it less likely to blend areas of similar color or bend other hard-to-distinguish areas together during optimization. The result is a crisper boundary line—i.e., the modified image will retain an edited hairstyle, rather than result in a bald-headed figure.

One example method that provides these benefits modifies an input image using a GAN. The modification is made to the input image based on constraints determined from a target image that is different in some aspect from the initial image. The resulting output is a modified initial image that has features simulating the target image.

To modify the initial image, the latent code of the initial image is determined. The latent code can be generated using a GAN trained to project the image into the image latent space, thus generating a latent code of the initial image. The latent code provides a lower dimensional vector representation of the image, which can be used to reconstruct the initial image.

Keypoints or segmentation masks can be identified from the reconstructed initial image. The keypoints identify landmarks on the initial image, such as the edge of an object, the intersection of multiple objects, and so forth. Segmentation masks can be identified in lieu of or in addition to the keypoints. The segmentation masks identify areas of the initial image, such as an object within an image. Keypoints or segmentation masks can also be identified for the target image. Various deep learning methods, such as a convolutional neural network (CNN), can be used and trained to identify keypoints and segmentation masks from images.

The GAN can again be employed to modify the latent code of the initial image. The GAN uses a loss function that includes an area of the target image as a constraint during the modification. The area of the target image used as the constraint is identified based on the keypoints or segmentation masks of the target image. The area of the target image can be selected as the constraint using the keypoints and segmentation mask. During modification of the latent code of the initial image, the latent vectors associated with an area of the initial image corresponding to the area of the target image used as the constraint are modified. This process optimizes the latent code of the initial image by minimizing the loss function, resulting in a modified latent code. The modified latent code can be constructed into a modified initial image, where the modified initial image comprises the initial image having a modified area that simulates the area of the target image used as the constraint.

Although this technology can be used on any images, including video, one specific example modifies images of human faces to have a likeness to aspects of another human face. In this case, the initial image includes a face that will be modified based on a face of a target image. The latent code of the initial image is determined, and facial keypoints or facial segmentation masks are determined for the initial image and the target image. If, for instance, the initial image includes a face that is frowning and the target image includes a face that is smiling, the face of the initial image can be modified using this constraint to include a smile.

Here, the mouth of the initial image and the mouth of the target image are identified using the facial keypoints and facial segmentation masks. The facial keypoints might identify landmarks defining the mouth, such as the edge of lips, the sides and bottoms of teeth, the corner of the mouth, etc. The facial segmentation masks might identify the area of the image represented by the mouth and assign pixels within the image as part of this area. The mouth area defined by the facial keypoints or facial segmentation masks of the target image are used as the constraints for optimization when minimizing the loss function, which modifies the latent code of the initial image during this process.

The resulting modified latent code of the initial image can be generated into a modified image. In this case, the modified image now comprises the face of the initial image having a smile, which simulates the smile of the target image, yet still provides a realistic visualization of the initial image face. In this way, the output is a realistic image of the initial image face having, what appears to be, a natural smile.

Example Image Editing System Operating Environment

Figure 1B:
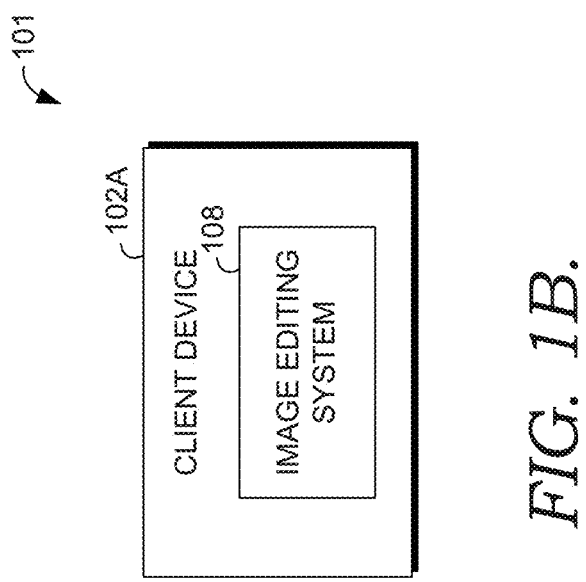
FIG. 1B is a block diagram of another example operating environment suitable for employing the image editing system, in accordance with an aspect described herein.

FIG. 1A depicts a block diagram of example operating environment 100 suitable for use in implementing the described technology. Generally, environment 100 is suitable for editing an image using a GAN, where the image is edited based on constraints determined from image keypoints or segmentation masks of another image. It should be understood that operating environment 100 shown in FIG. 1A is an example of one suitable operating environment. Another example operating environment suitable for use is illustrated by FIG. 1B.

As illustrated, operating environment 100 includes client devices 102A and 102B through 102R, which are in communication via network 104 to server 106. Client device 102B is illustrated as having an ellipsis drawn between it and client device 102R, which is meant to indicate that any number of client devices may be associated with operating environment 100. As further described below, the arrangement illustrated in FIG. 1A, having client devices 102A and 102B through 102R remote from server 106, is but one example. In another arrangement, one or more of client devices 102A and 102B through 102R may comprise server 106. Each of the components illustrated may be implemented via any type of computing device, such as computing device 700 described in connection to FIG. 7.

Client devices, such as client devices 102A through 102R, can be any type of computing device capable of being operated by a client, which may be any person or entity that interacts with server 106. In some implementations, client devices 102A through 102R are the type of computing device described in relation to FIG. 7. For example, client device 102A may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. Client device 102A can include a display device for displaying an image. Although reference has been made only to client device 102A, it is intended here and throughout this disclosure that client devices 102B through 102R are equally considered.

Client device 102A can include one or more processors and one or more computer-readable media. The computer-readable media may include computer-readable instructions executable by the one or more processors. The instructions may be embodied by one or more applications, such as application 110, shown in FIG. 1A. Application 110 is referred to as a single application for simplicity, but its functionality can be embodied by one or more applications in practice. Application 110 is generally capable of facilitating the exchange of information between client devices 102A through 102R or server 106. For example, application 110 facilitates receiving information or sending information in the form of images, which are utilized or generated by server 106.

Application 110 may comprise a web application, which can run in a web browser, and could be hosted at least partially on the server-side of operating environment 100. Application 110 can comprise a dedicated application, such as an application having analytics functionality. In some cases, application 110 is integrated into the operating system (e.g., as a service or program). It is contemplated that "application" be interpreted broadly. In some embodiments, application 110 may be integrated with image editing system 108, which is illustrated as residing on server 106.

Server 106 generally supports image editing system 108. Server 106 includes one or more processors, and one or more computer-readable media. The computer-readable media includes computer-readable instructions executable by the one or more processors. The instructions may optionally implement one or more components of image editing system 108, described in additional detail below with reference to FIG. 2.

As discussed, FIG. 1A is only an example operating environment. FIG. 1B is provided to illustrate another example operating environment 101 where image editing system 108 resides at client device 102A. While FIG. 1B illustrates image editing system 108 wholly residing on client device 102A, it will be appreciated that other distributed arrangements can be employed, for example, where client device 102A hosts one or more functions of image editing system 108, while another one or more functions are hosted on a remote server.

Figure 2:
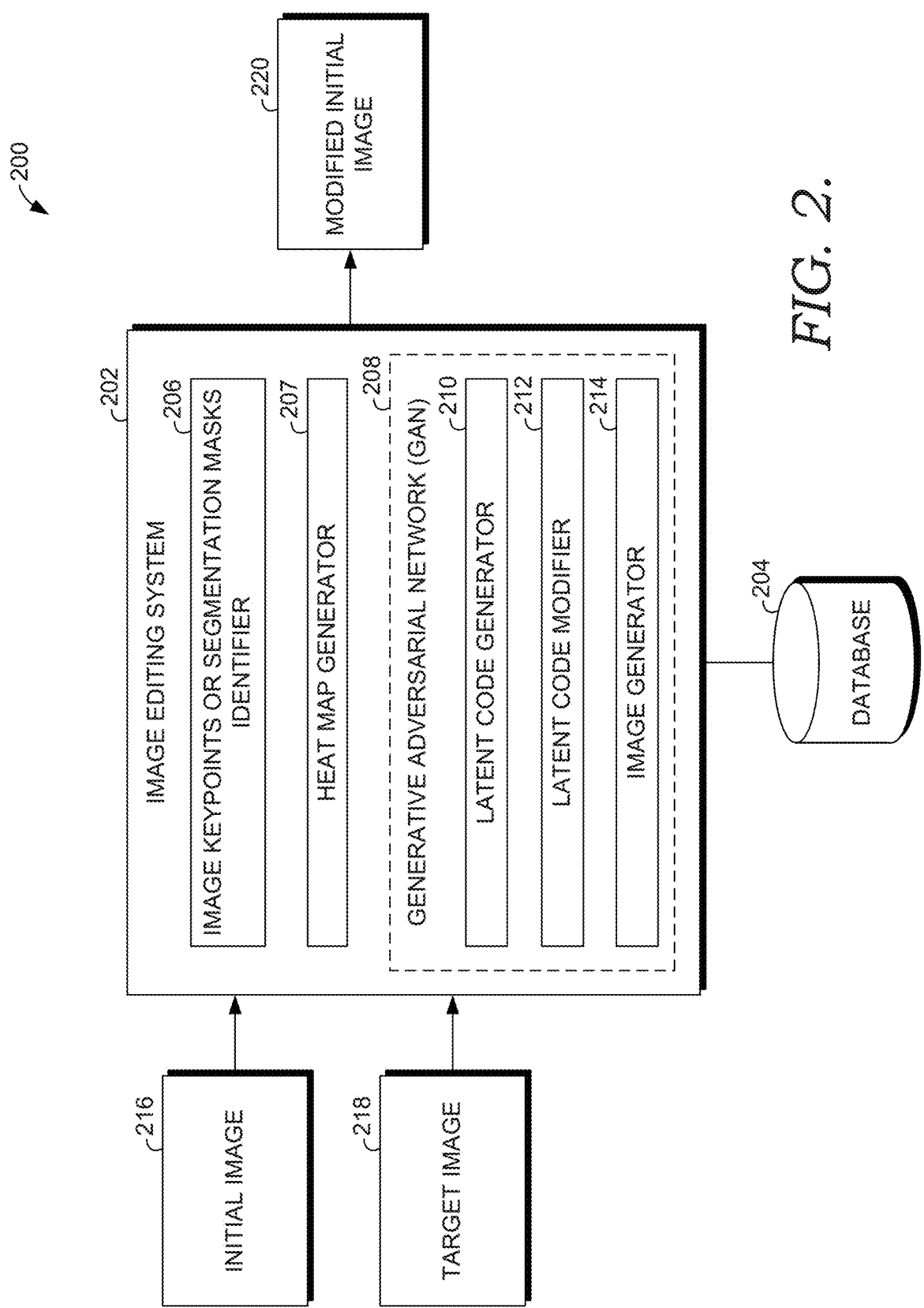
FIG. 2 is a block diagram of an example image editing system, in accordance with an aspect described herein.

It should be appreciated that while image editing system 108 is depicted as a single system, it can function as multiple systems capable of performing all the attributes that are described in conjunction with FIG. 2.

With reference now to FIG. 2, block diagram 200 of example image editing system 202 is provided. FIG. 2 is just one example arrangement suitable for implementing the technology; however, other arrangements are sufficient for use as well. Image editing system 202 may be employed as image editing system 108 of FIGS. 1A-1B.

Image editing system 202 is shown in communication with database 204. Database 204 generally stores information, including data, computer instructions (e.g., software program instructions, routines, or services), or models of image editing system 202 or used by image editing system 202. Although depicted as a single database component, database 204 may be embodied as one or more data stores or may be in the cloud. One example of the data store is ADOBE® Data Warehouse. An example suitable for use is memory 712 of FIG. 7.

In general, image editing system 202 utilizes a GAN to modify an image based on the constraints of another image, as determined by keypoints and segmentation masks. Image editing system 202 is illustrated as comprising image keypoints or segmentation masks identifier 206, heatmap generator 207, and GAN 208, where GAN 208 includes latent code generator 210, latent code modifier 212, and image generator 214. It is intended that the term "image" be interpreted to include any visual information. Examples include still images that represent visual information captured at a moment in time and video that represents visual information collected over a timeframe.

Image keypoints and segmentation masks identifier 206 generally identifies keypoints, segmentation masks, or both for an image. The keypoints or segmentation masks can be identified for the initial image, the target image, or both. A machine learned model trained to determine keypoints or segmentation masks for an image can be used for the identification. As an example, deep learning methods, such as deep convolutional neural networks, can be trained to receive an image and output keypoints for the image. One software system suitable for use in identifying keypoints in an image includes Scale-Invariant Feature Transform (SIFT). Similarly, segmentation masks can be identified from an image using a machine learned model trained to identify the segmentation masks, which can also include deep learning methods. Examples suitable for use in identifying segmentation masks include image segmentation models developed by Fritz AI or NVIDIA's Mask R-CNN open source software. Throughout this disclosure, keypoints may be referred to as "image keypoints," and in the special case of a keypoints for an image of a face, may be referred to as "facial image keypoints" or "facial keypoints." Similarly, segmentation masks may be referred to as "image segmentation masks" or, in the special case of a facial image, "facial segmentation masks."

Heatmap generator 207 of image editing system 202 generally generates a heatmap from an image. The heatmap is a representation of an identified area of the image and may include an additional representation for an intensity of the data within the identified area. A heatmap can be generated based on the keypoints or segmentation masks identified for the image using image keypoints or segmentation masks identifier 206.

Heatmap generator 207 generates a heatmap using the keypoints by identifying an area of the image that is defined by the keypoints. For instance, facial keypoints may identify an outline of lips on a face, along with the corner of the mouth, and ends and edges of teeth and so forth. Using the locations of the keypoints, heatmap generator 207 generates the heatmap to identify particular areas of the image, such as generating a heatmap of the mouth based on the location of the facial keypoints. Heatmap generator 207 generates a heatmap based on segmentation masks. Here, each generated heatmap can represent a segment of the image identified by image keypoints or segmentation masks identifier 206. For instance, heatmap generator 207 can generate a heatmap based on a segment of a facial image representing an area identified as a nose. Heatmap generator 207 may generate a heatmap that is a representation of a group of pixels that is associated with a particular area of the image that is defined by the keypoints or segmentation masks.

In either case, heatmap generator 207 can generate a plurality of heatmaps, each heatmap representing a different area of the image. Each of the heatmaps may be referred to as a "layer." Thus, the image can be expanded into a plurality of layers of heatmaps, each heatmap representing a different area of the image based on the keypoints and segmentation masks identified for the image. In a particular case, there are nineteen heatmaps generated for an image. Heatmap generator 207 can generate heatmaps for the initial image, the target image, or both. Heatmap generator 207 may generate heatmaps from modified images, such as a modified initial image, as part of an optimization process, which will be described in more detail with reference to FIGS. 3A and 3B. In some cases, heatmap generator 207 generates a combined target heatmap formed from multiple heatmap layers into one layer. Any number and variation of the plurality of heatmaps can be combined to form a combined target heatmap for use by components of image editing system 202. To generate the combined target heatmap from one or more of the plurality of heatmaps, heatmap generator 207 can use an argmax function.

Image editing system 202 also includes GAN 208. In general, GAN 208 generates and modifies a latent code of an image. GAN 208 also generates an image from a latent code. GAN 208 can be any GAN known in the art. One such GAN suitable for use as GAN 208 is described in the paper "Generative Visual Manipulation on the Natural Image Manifold," by Jun-Yan Zhu, Philipp Krahenbuhl, Eli Shechtman, and Alexei A. Efros, published Sep. 12, 2016, and updated Dec. 16, 2018, v.3, arXiv.org No. 1609.03552v3, available at https://arxiv.org/abs/1609.03552v3, which is hereby incorporated by reference in its entirety. As described herein and as illustrated in FIG. 2, GAN 208 includes latent code generator 210, latent code modifier 212, and image generator 214. GAN 208 is described with reference to each of these components in an effort to more clearly describe aspects and functionality of GAN 208. It will be appreciated, however, by those of ordinary skill in the art that certain GANs may include more or less functionality, and that various components of these GANs can perform the functions described in this disclosure. As such, the description of the components of GAN 208 is not intended to limit the disclosure to particular neural networks or GANs, or to limit the functions of a GAN to any particular order or sequence of functions.

GAN 208 uses latent code generator 210 to generate the latent code of an image. In this way, an image is projected into the image latent space. In the image latent space, the image is represented by image latent vectors, which GAN 208 can use to reconstruct the image. In some cases, the image latent vectors are a low-dimensional representation of the image. To project the image into the image latent space, latent code generator 210 can be trained to encode the image into a latent vector representation of the image. This latent vector representation comprises information that can be decoded back into the image by GAN 208. The latent code can be generated for images, including video, which can be done frame-by-frame, and can be done for two-dimensional representations of space and for three-dimensional imagery. Thus, latent code generator 210 provides the latent code of an image, which can be used by other components of GAN 208, such as latent code modifier 212.

Latent code modifier 212 generally modifies the latent code of an image to generate a modified latent code. To modify the latent code, latent code modifier 212 uses a loss function associated with GAN 208. Specific example loss functions suitable for use will be described in more detail. More generally, however, the loss function includes a variable that applies a constraint during modification of the image latent code. The constraint can be determined from keypoints and segmentation masks. For example, the constraint can be one or more heatmap layers determined from the keypoints or segmentation masks of the image or may be a combined target heatmap representing a combined target formed by assembling multiple heatmap layers into one layer. A generator network of latent code modifier 212 of GAN 208 can act on the latent code subject to the constraint to modify the latent code. Latent code modifier 212 continues this modification iteratively as part of an optimization process. Here, latent code modifier 212 incrementally modifies the latent code so as to minimize the loss function.

Image generator 214 generally generates an image from a latent code. Image generator 214 can include a neural network associated with GAN 208. As noted, the latent code includes a vector representation of the image that comprises information usable to generate the image. Thus, using an input of the vector representation of the latent code, image generator 214 outputs a visual image corresponding to the information of the vector representation. It will be appreciated that modifications made to the latent code result in a modified latent code. In a similar fashion, image generator 214 can generate a modified visual image that corresponds to the modified vector representation of the modified latent code.

Described as a working example, image editing system 202 receives initial image 216. Latent code generator 210 generates the latent code having a vector representation of initial image 216. Image generator 214 reconstructs initial image 216, providing a reconstructed initial image from the latent code. Image keypoints or segmentation masks identifier 206 is employed to identify initial image keypoints or segmentation masks from the reconstructed initial image. Additionally, image editing system 202 receives target image 218. Image keypoints or segmentation masks identifier 206 also identifies the target image keypoints or segmentation masks from target image 218.

Heatmap generator 207 generates heatmaps for initial image 216 using the initial image keypoints or segmentation masks and generates heatmaps for target image 218 using the target image keypoints or segmentation masks. That is, heatmap generator 207 uses either identified keypoints to generate the heatmaps, identified segmentation masks to generate heatmaps, or a combination of both. These identified keypoints and segmentation masks for initial image 216 and target image 218 identify different areas of the images. Heatmap generator 207 generates a plurality of heatmaps, such that each heatmap represents a different area of initial image 216 or target image 218.

Heatmaps of initial image 216 and heatmaps of target image 218 can correspond. Put another way, a heatmap layer of initial image 216 can represent an area of initial image 216 that corresponds to an area of target image 218 represented by a heatmap layer of target image 218. By way of example, where initial image 216 is a face that includes ears, hair, and a mouth, heatmap generator 207 generates a heatmap layer for each of the ears, hair, and mouth. Similarly, where target image 218 is a face that also includes ears, hair, and a mouth, heatmap layers can also be generated to represent each. As such, the initial image heatmap representing an area associated with the initial image ears corresponds to the target image heatmap representing the target image ears, and likewise for the heatmaps representing the hair and mouth.

Latent code modifier 212 uses the target image keypoints or segmentation masks as constraints to modify the latent code of initial image 216, thus generating a modified latent code. Latent code modifier 212 can use the target image heatmaps generated by heatmap generator 207 as the constraint when modifying the latent code of initial image 216. The latent code is modified using a loss function of latent code modifier 212 that includes one or more of the target image heatmaps, or a combined target heatmap as a variable. By minimizing the loss function of latent code modifier 212, the latent code of initial image 216 is modified to generate the modified latent code. In cases, a portion of the latent code represented by an initial image heatmap that corresponds to a target image heatmap used as the constraint is modified. Said differently, the target image heatmaps or the combined target heatmap that is used as the constraint may include corresponding initial image heatmaps. The initial image heatmaps represent areas of initial image 216, and these areas are projected into latent vectors in the latent code. The portion of the latent code that represents the initial image heatmaps corresponding to the target heatmaps of the constraint is modified.

The modification of the latent code by latent code modifier 212 is performed as part of a process that minimizes the loss function. One loss function having a constraint based on segmentation masks that can be used as part of this process is as follows:

$$L_{mask} = -\Sigma y_{target} \log h(G(w))$$

A suitable loss function for constraints based on keypoints that can be used is as follows:

$$L_{keypoints} = L_2(k(x_{target}), k(G(w)))$$

Here, $y_{target}$ represents a combined target heatmap. h corresponds to the segmentation masks heatmaps. $x_{target}$ represents an image heatmap, while k corresponds to one or more heatmaps based on keypoints. G is a generator of GAN 208, and w is the latent vector.

Using either of these loss functions, the optimization process can be performed by executing the following:

$$w^* = \arg\min_{w \in W} L(w,c)$$

In this case, w represents the latent vector, while c provides for a color constraint. The color constraint can be included as part of the optimization process to maintain the colors of the initial image. The result is w*, which is the modified latent vector of the modified latent code.

Having modified the latent code of initial image 216, image generator 214 generates a first modified initial image. The first modified initial image includes areas of initial image 216 that have been modified to simulate areas of target image 218. The areas of the first modified initial image that are modified may correspond to areas of target image 218 that are used as the constraint. This modification is part of an iterative optimization process. As such, the first modified image is used as an input for image keypoints and segmentation masks identifier 206 to generate keypoints or segmentation masks, from which heatmap generator 207 generates heatmaps. The latent code associated with the generated heatmaps for the first modified initial image can be modified by latent code modifier 212 based on the constraint determined from target image 218. The output of this modification is a second modified initial image. This iterative process repeats so as to minimize the loss function. During each iteration, the areas of initial image 216 that are modified begin to simulate, with a greater likeness, the areas of target image 218 used as the constraint. The resulting output is modified initial image 220, which includes areas that simulate corresponding areas of target image 218.

In another example embodiment, an initial image is modified based on edits to the initial image. In this embodiment, there is no target image as an input. Instead, the constraints are identified from heatmaps generated from initial image modifications. Here, keypoints or segmentation masks are generated for the initial image and presented to a user. The user manipulates the identified keypoints or segmentation masks of the image. From the manipulated keypoints or segmentation masks, heatmaps can be generated. These heatmaps are used to generate one or more heatmaps or a combined target heatmap that is used as the constraint for editing the initial image. Once the manipulated keypoints or segmentation masks are received from the user, the optimization process can occur similar to the process described throughout this disclosure, while using the manipulated keypoints or segmentation masks as the basis for the constraint.

Figure 3A:
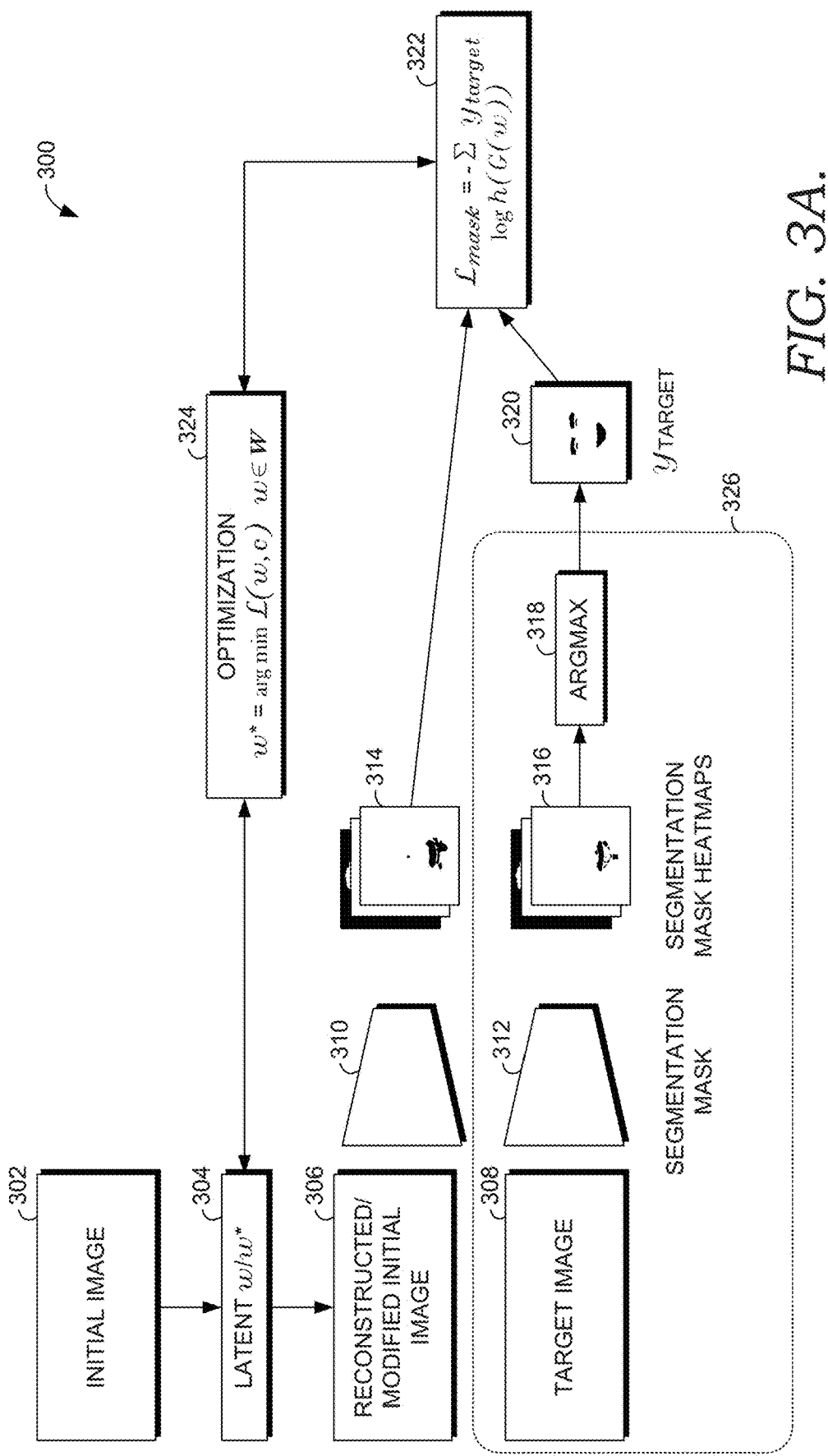
FIGS. 3A-3B are flow diagrams illustrating example operations performed by the image editing system of FIG. 2, in accordance with an aspect described herein.
Figure 3B:
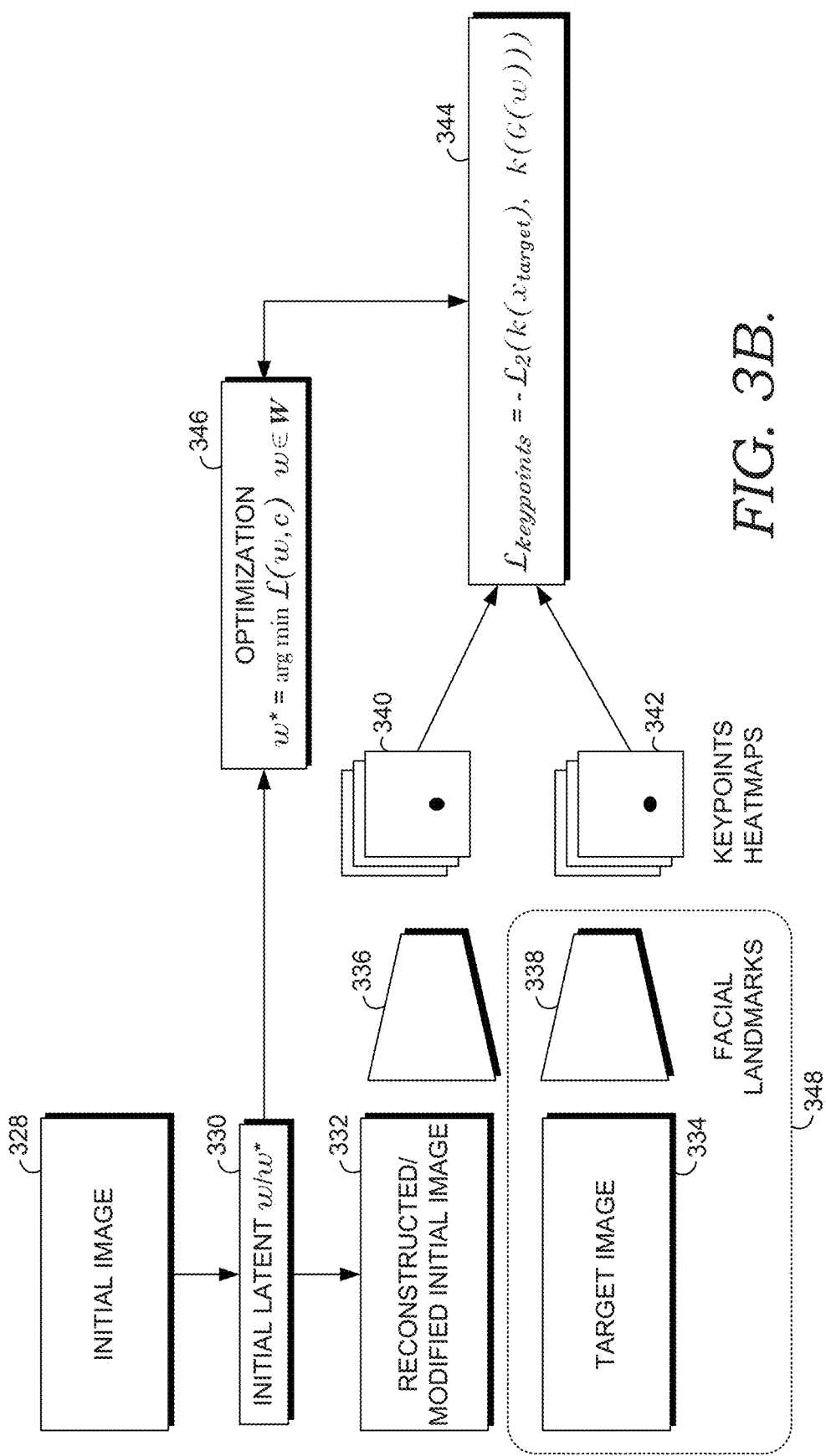

FIGS. 3A and 3B provide flow diagrams illustrating example operations that can be performed by image editing system 202 of FIG. 2 to edit images. In particular, FIG. 3A illustrates the image editing operations where segmentation masks are used as the constraint. Here, initial image 302 is received for editing. The latent code of initial image 302 can be generated, illustrated here as latent w/w* 304. The initial image latent code can be generated using latent code generator 210. From the initial image latent code, reconstructed/modified initial image 306 can be generated, for example, by using image generator 214. At this point, reconstructed/modified initial image 306 is nearly indistinguishable from initial image 302. Additionally, target image 308 is received for use in determining constraints.

The segmentation masks are identified for both reconstructed/modified initial image 306 and target image 308. Image keypoints and segmentation masks identifier 206 can be used to identify the initial image segmentation masks for reconstructed/modified initial image 306 and the target image segmentation masks for target image 308. From the segmentation masks, heatmaps are generated using heatmap generator 207. As shown in FIG. 3A, block 310 is illustrated to represent the identification of initial image segmentation masks from reconstructed/modified initial image 306, and from the initial image segmentation masks, the generation of initial image heatmaps 314. Similarly, block 312 is illustrated to represent the identification of target image segmentation masks from target image 308, and from the target image segmentation masks, the generation of target image heatmaps 316.

As previously discussed, one or more of the target image heatmaps 316 can be used as a constraint during optimization. In the embodiment illustrated by FIG. 3A, the constraint is based on combined target heatmap 320, labeled as $y_{target}$. Combined target heatmap 320 is determined from any number and variation of target image heatmaps 316 using argmax function 318.

To modify initial image 302, the optimization process includes loss function 322, which is used by latent code modifier 212. Loss function 322 modifies the initial image latent code based on the target image segmentation masks using combined target heatmap 320 as the constraint. The optimization process minimizes loss function 322 by applying optimization function 324. The resulting modified initial image latent code is now represented by latent w/w* 304, from which reconstructed/modified initial image 306 is constructed. As described, the optimization process is iterative and progresses in this manner to continue minimizing the loss function. The process can be stopped after a predetermined number of iterations or when reconstructed/modified initial image 306 nears a quality level threshold.

Dotted line 306 is provided to illustrate image editing when a target image is not used. In another embodiment, a user manipulates the initial image segmentation masks identified from reconstructed/modified initial image 306. In this case, the manipulated segmentation masks can be used to form the constraint $y_{target}$, and the process continues as illustrated to minimize loss function 322.

FIG. 3B illustrates the image editing operations where keypoints are used as the constraint. Here, initial image 328 is received for editing. The latent code of initial image 328 can be generated, illustrated here as latent w/w* 330. The initial image latent code can be generated using latent code generator 210. From the initial image latent code, reconstructed/modified initial image 332 can be generated, for example, by using image generator 214. At this point, reconstructed/modified initial image 332 is nearly indistinguishable from initial image 328. Additionally, target image 334 is received for use in determining constraints.

The keypoints are identified for both reconstructed/modified initial image 332 and target image 334. Image keypoints and segmentation masks identifier 206 can be used to identify the initial image keypoints for reconstructed/modified initial image 332 and the target image segmentation masks for target image 334. From the keypoints, heatmaps are generated using heatmap generator 207. Block 336 is illustrated to represent the identification of initial image keypoints from reconstructed/modified initial image 332, and from the initial image keypoints, the generation of initial image heatmaps 340. Similarly, block 338 is illustrated to represent the identification of target image keypoints from target image 334, and from the target image keypoints, the generation of target image heatmaps 342.

One or more of the target image heatmaps 342 can be used as a constraint during optimization. To modify initial image 328, the optimization process includes loss function 344, which is used by latent code modifier 212. Loss function 344 modifies the initial image latent code based on the target image heatmap 342 as the constraint. The optimization process minimizes loss function 344 by applying optimization function 346. The resulting modified initial image latent code is now represented by latent w/w* 330, from which reconstructed/modified initial image 332 is constructed. As described, the optimization process is iterative and progresses in this manner to continue minimizing the loss function. The process can be stopped after a predetermined number of iterations or when reconstructed/modified initial image 332 nears a quality level threshold.

Dotted line 348 is provided to illustrate image editing when a target image is not used. In another embodiment, a user manipulates the initial image keypoints identified from reconstructed/modified initial image 332. In this case, the manipulated keypoints can be used to form the constraint $x_{target}$, and the process continues as illustrated to minimize loss function 344.

Figure 4:
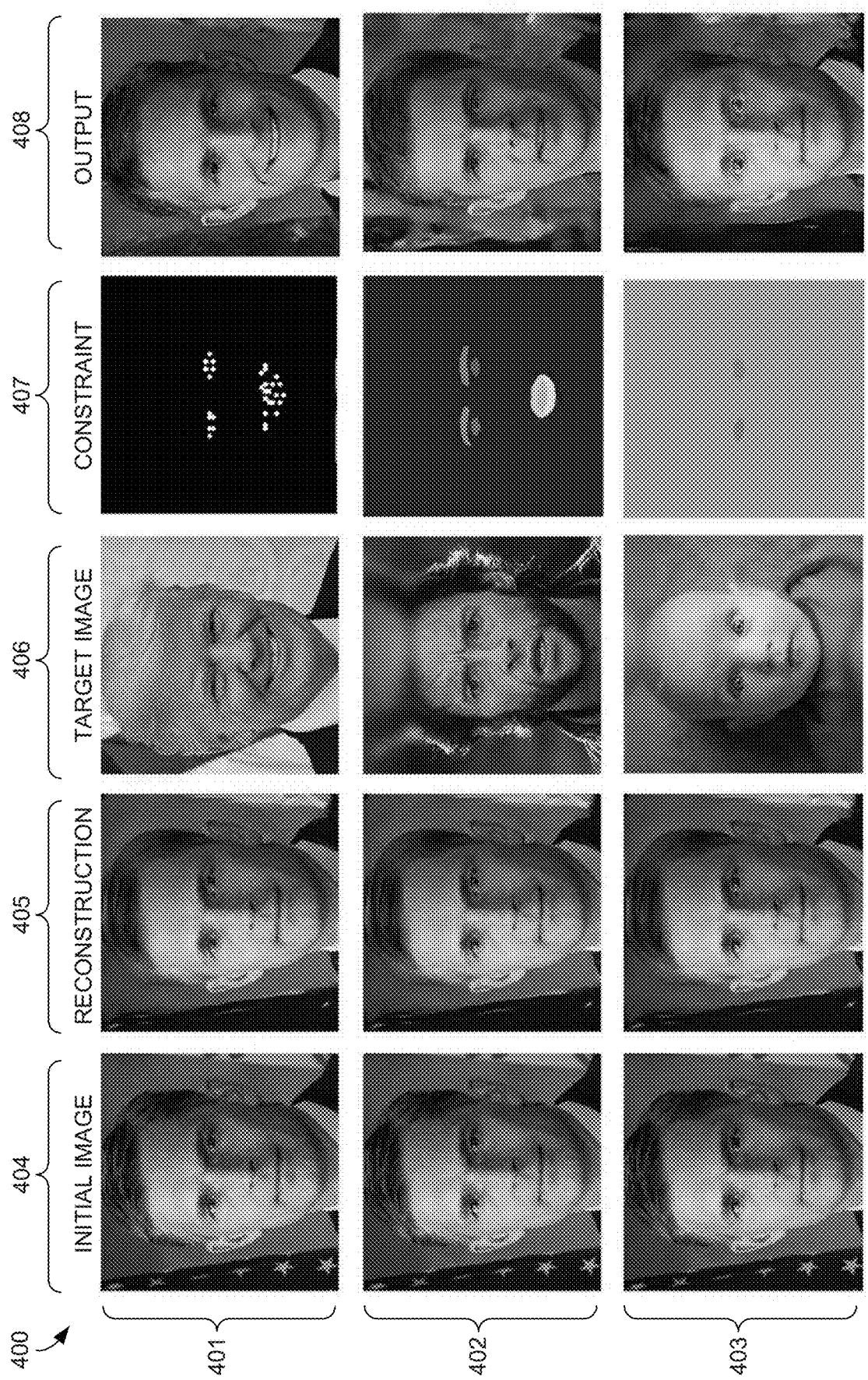
FIG. 4 provides input and output images for example use cases of the image editing system of FIG. 2, in accordance with an aspect described herein.

FIG. 4 is provided to illustrate example results obtained utilizing image modification system 202 of FIG. 2. FIG. 4 illustrates rows 401-403. Each row illustrates an initial image being modified to form a modified initial image based on a constraint determined from a different target image. Row 401 illustrates this process being performed using keypoints, while row 402 and row 403 illustrate this processing being performed using segmentation masks.

In the first example provided by row 401, an initial image is shown at the intersection of row 401 and column 404. From the initial image, the latent code is determined, and a reconstructed image is generated, as shown at row 401 and column 405. The target image for the modification is illustrated at the intersection of row 401 and column 406, from which keypoints are identified, shown at row 401 and column 407. Optimization is performed so as to minimize the loss function of the GAN, and the resulting output is the modified initial image, illustrated at row 401 and column 408, which includes features simulating the target image based on the keypoints constraint.

In the second and third examples provided by rows 402-403, respectively, an initial image is shown at the intersection of rows 402-403 and column 404. From the initial images, the latent code is determined, and a reconstructed image is generated for each, as shown at rows 402-403 and column 405. The target images for the modifications are illustrated at the intersections of rows 402-403 and column 406, from which segmentation masks are identified and used to determine the constraint, shown at rows 402-403 and column 407. Optimization is performed so as to minimize the loss function of the GAN, and the resulting outputs are the modified initial images, illustrated at rows 402-403 and column 408, which include features simulating the target images based on the constraints determined from the segmentation masks.

With specific reference back to FIGS. 1A-1B, and with reference to all of the figures generally, it should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. It should also be understood that any number of user devices, servers, and other components may be employed within operating environment 100 within the scope of the present disclosure. Each may comprise a single device or multiple devices cooperating in a distributed environment or in the cloud.

Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory as further described with reference to FIG. 7.

Each of the components shown in FIGS. 1A-1B, and again within the figures generally, may be implemented via any type of computing device, such as one or more of computing device 700 described in connection to FIG. 7, for example. These components may communicate with each other via a network, such as network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

Example Flow Diagrams

Figure 5:
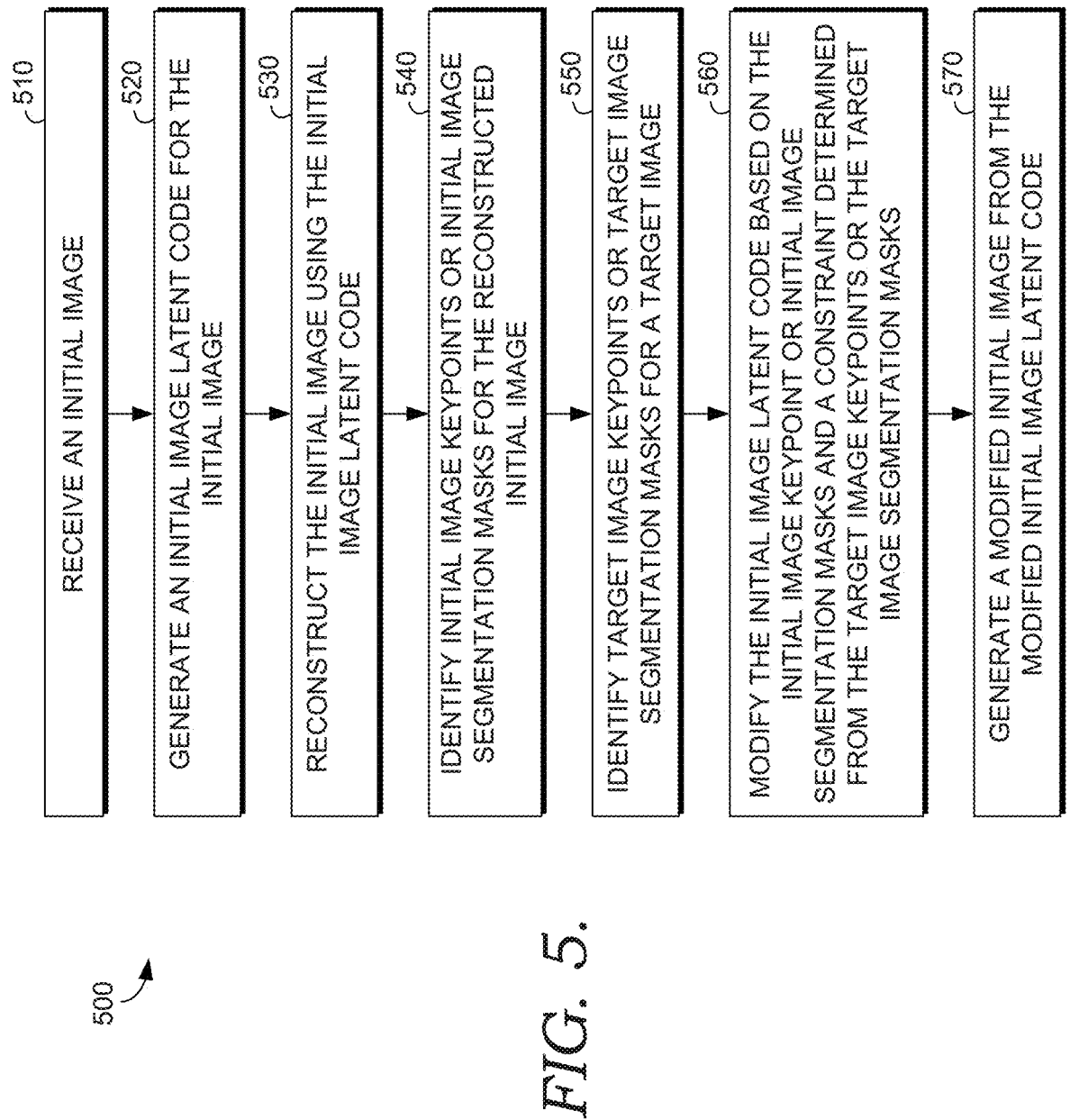
FIG. 5 is a flow diagram illustrating an example method for editing images using an image editing system, in accordance with an aspect described herein.
Figure 6:
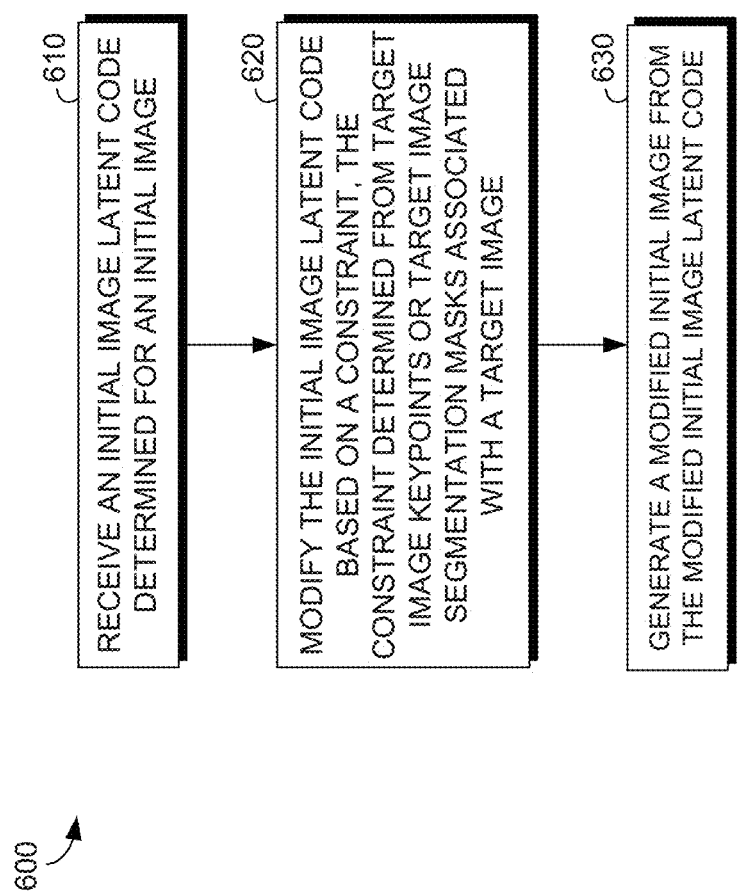
FIG. 6 is a flow diagram illustrating another example method for editing images using an image editing system, in accordance with an aspect described herein.

With reference now to FIGS. 5 and 6, flow diagrams are provided illustrating methods 500 and 600 for editing image. Each block of methods 500 and 600, and any other methods described herein, comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The methods 500 and 600 may be implemented by image editing system 202, as described in conjunction with FIGS. 1-4.

Turning initially to FIG. 5, method 500 for editing images is illustrated. At block 510, an initial image is received. The initial image can be an image that is to be edited. At block 520, an initial image latent code is generated. For example, the initial image latent code can be generated from the initial image using latent code generator 210 of FIG. 2. At block 530, the initial image is reconstructed into a reconstructed initial image. The reconstructed initial image can be generated using image generator 214. At block 540, initial image keypoints or initial image segmentation masks are identified from the reconstructed initial image, for example, using image keypoints or segmentation masks identifier 206. At block 550, target image keypoints or target image segmentation masks are identified for a target image. In some cases, a target image heatmap is determined from the target image keypoints or the target image segmentation masks, and an initial image heatmap is determined from initial image keypoints or segmentation masks identified for the initial image. The initial image heatmap and the target image heatmap may represent corresponding areas of the initial image and the target image, respectively. At block 560, the initial image latent code is modified based on a constraint. The constraint is determined from the target image keypoints or the target image segmentation masks. In addition to the constraint, the initial image latent code can be modified based on the initial image keypoints or the initial image segmentation masks. The constraint may be determined from the target image keypoints or segmentation maps based on the target image heatmap. The target image heatmap may include a selected heatmap from among a plurality of heatmap layers or may be a combined target heatmap. The modification can be performed using a GAN executing a loss function having a variable for the constraint. The GAN may be an unconditional GAN. At block 570, a modified initial image is generated from the modified initial image latent code. In a particular case, the initial image and the target image each comprises a face. In this case, the target image keypoints or the target image segmentations masks respectively comprise target image facial keypoints or target image facial segmentation masks, and the modified initial image comprises a modification to the face of the initial image, where the modification simulates a portion of the target image associated with the constraint.

Turning now to FIG. 6, method 600 for editing an image is illustrated. At block 610, an initial image latent code is received. The initial image latent code is determined for an initial image. At block 620, the initial image latent code is modified based on a constraint. The constraint is determined from target image keypoints or target image segmentation masks associated with a target image. The modification may be performed by a conditional GAN by minimizing a loss function having a variable based on the target image keypoints or target image segmentation masks. The modification can be made based on corresponding heatmaps generated for each of the initial image and the target image. At block 630, a modified initial image is generated from the modified initial image latent code.

Example Operating Environment

Having described an overview of the technology, along with various examples, an exemplary operating environment in which embodiments of the technology may be implemented is described below in order to provide a general context for various embodiments. Referring now to FIG. 7 in particular, an exemplary operating environment for implementing embodiments of the technology is shown and designated generally as computing device 700. Computing device 700 is but one example of a suitable computing environment and is not intended to suggest any limitation as to the scope of use or functionality of the technology. Neither should computing device 700 be interpreted as having any dependency or requirement relating to any one or combination of components illustrated.

The technology may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

Figure 7:
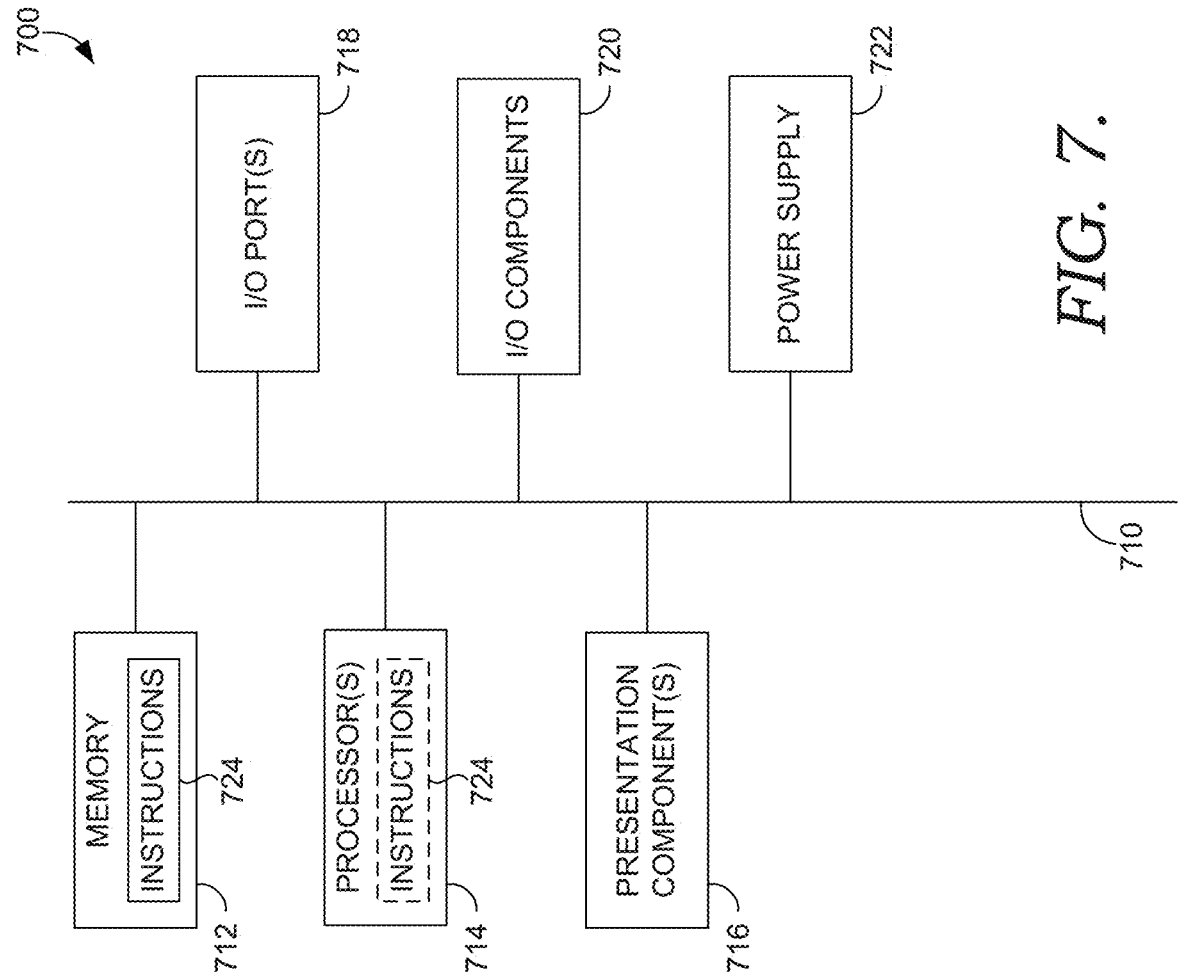
FIG. 7 is a block diagram of an example operating environment in which embodiments of the present technology may be employed.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 700. Computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of computing device 700 to render immersive augmented reality or virtual reality.

Embodiments described herein support system, media, and methods for image editing. The components described herein refer to integrated components of an image editing system. The integrated components refer to the hardware architecture and software framework that support functionality using the image editing system. The hardware architecture refers to physical components and interrelationships thereof and the software framework refers to software providing functionality that can be implemented with hardware embodied on a device.

The end-to-end software-based image editing system can operate within the image editing components to operate computer hardware to provide product recommendation system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low-level software written in machine code, higher level software such as application software, and any combination thereof. In this regard, the image editing system components can manage resources and provide services for the image editing system functionality. Any other variations and combinations thereof are contemplated with embodiments of the present disclosure.

Having identified various components in the present disclosure, it should be understood that any number of components and arrangements might be employed to achieve the desired functionality within the scope of the technology. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion, embodiments of the present technology described with reference to a distributed computing environment; however, the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. One or more computer storage media having computer-useable instructions that, when used by one or more computing devices, cause the one or more computing devices to perform operations for image modification, the operations comprising:
   receiving an initial image;
   generating an initial image latent code for the initial image;
   reconstructing the initial image from the initial image latent code;
   identifying initial image keypoints or initial image segmentation masks from the reconstructed initial image;
   identifying target image keypoints or target image segmentation masks for a target image, the target image different from the initial image;
   determining a plurality of target image heatmaps from the target image keypoints or the target image segmentation masks, each target image heatmap representing a different portion of the target image;
   modifying the initial image latent code based on the initial image keypoints or the initial image segmentation masks and a constraint determined based on the plurality of target image heatmaps; and
   generating a modified initial image from the modified initial image latent code.

2. The media of claim 1, wherein the modification to the initial image latent code is performed using a loss function of a generative adversarial network, the loss function having a variable associated with the constraint determined from the target image keypoints or the target image segmentation masks.

3. The media of claim 2, wherein the generative adversarial network is unconditional.

4. The media of claim 1, further comprising determining an initial image heatmap from the initial image keypoints or initial image segmentation masks, the initial image heatmap representing a portion of the initial image, wherein the initial image heatmap and a target image heatmap of the plurality of target image heatmaps represent corresponding portions.

5. The media of claim 4, wherein the initial image latent code associated with the initial image heatmap and the target image heatmap are inputs to a generative adversarial network.

6. The media of claim 1, further comprising receiving a selected target image heatmap from the plurality of target image heatmaps, wherein the selected target image heatmap determines the constraint for modifying the initial image latent code.

7. The media of claim 6, wherein the initial image and the target image each comprises a face, the target image keypoints or the target image segmentation masks respectively comprising target image facial keypoints or target image facial segmentation masks, the modified initial image comprising a modification to the face of the initial image, the modification simulating an area of the target image associated with the selected target image.

8. The media of claim 1, wherein modifying the initial image latent code is performed as part of an optimization process, the optimization process including a color constraint that maintains pixel color of the initial image.

9. The media of claim 1, further comprising assembling the plurality of target image heatmaps into a combined target image heatmap, wherein the combined target image heatmap is provided as the constraint for modifying the initial image.

10. A computerized method for image modification, the method comprising:
receiving an initial image latent code determined for an initial image;
modifying the initial image latent code based on a constraint, wherein the constraint is determined based on a plurality of target image heatmaps that each represent a different portion of a target image, and wherein the plurality of target image heatmaps is determined from target image keypoints or target image segmentation masks of the target image, the target image different from the initial image; and
generating a modified initial image from the modified initial image latent code.

11. The method of claim 10, wherein the initial image latent code is modified using a generative adversarial network based on the constraint.

12. The method of claim 11, wherein the generative adversarial network is unconditional.

13. The method of claim 10, wherein a portion of the initial image latent code associated with an initial image heatmap is modified, the initial image heatmap representing an area of the initial image that corresponds to an area of the target image represented by a target image heatmap of the plurality of target image heatmaps.

14. The method of claim 10, further comprising receiving a selected target image heatmap from the plurality of target image heatmaps, wherein the selected target image heatmap determines the constraint for modifying the initial image latent code.

15. The method of claim 10, wherein the initial image and the target image each comprises a face, the target image keypoints or the target image segmentation masks respectively comprising target image facial keypoints or target image facial segmentation masks, the modified initial image comprising a modification to the face of the initial image, the modification simulating an area of the target image associated with the constraint.

16. The method of claim 10, wherein modifying the initial image latent code is performed as part of an optimization process, the optimization process including a color constraint that maintains pixel color of the initial image.

17. The method of claim 10, wherein the constraint further comprises a combined target image heatmap generated from a combination of two or more target image heatmaps of the plurality of target image heatmaps.

18. A computer system for image modification, the system comprising:
means for modifying an initial image latent code of an initial image, the modification based on a constraint determined based on a plurality of target image heatmaps that each represent a different portion of a target image, wherein the plurality of target image heatmaps is determined from target image keypoints or target image segmentation masks associated with the target image, the target image different from the initial image, wherein the means for modifying the initial image latent code comprises a generative adversarial network, the generative adversarial network including a loss function having a variable associated with the constraint; and
means for generating a modified initial image from the modified initial image latent code.

19. The system of claim 18, wherein the generative adversarial network is unconditional.

20. The system of claim 18, wherein the plurality of target image heatmaps layers to form a combined target image heatmap, and the combined target image heatmap is provided as the constraint.

* * * * *